United States Patent
Murakami et al.

(10) Patent No.: US 8,533,499 B2
(45) Date of Patent: Sep. 10, 2013

(54) POWER USAGE METHOD AND DEVICE THAT RECEIVES POWER FROM HOST

(75) Inventors: Keiichi Murakami, Osaka (JP); Kazuyuki Takaki, Kawasaki (JP); Makoto Saotome, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 154 days.

(21) Appl. No.: 13/067,553

(22) Filed: Jun. 8, 2011

(65) Prior Publication Data

US 2011/0239029 A1   Sep. 29, 2011

Related U.S. Application Data

(63) Continuation of application No. PCT/JP2008/003704, filed on Dec. 11, 2008.

(51) Int. Cl.
   *G06F 1/26* (2006.01)
(52) U.S. Cl.
   USPC ............... 713/300; 713/310; 713/340
(58) Field of Classification Search
   USPC .......................... 713/300, 310, 340
   See application file for complete search history.

(56) References Cited

U.S. PATENT DOCUMENTS

| 7,271,568 B2* | 9/2007 | Purdy et al. | 320/106 |
| 7,528,574 B1* | 5/2009 | Adkins et al. | 320/128 |
| 7,834,591 B2 | 11/2010 | Hussain et al. | |
| 2005/0046391 A1* | 3/2005 | Veselic et al. | 320/133 |
| 2007/0108938 A1* | 5/2007 | Veselic | 320/111 |
| 2011/0025277 A1 | 2/2011 | Hussain et al. | |

FOREIGN PATENT DOCUMENTS

| JP | 2003-216284 | 7/2003 |
| JP | 2005-012889 | 1/2005 |
| JP | 2007-221992 | 8/2007 |
| JP | 2008-217147 | 9/2008 |

OTHER PUBLICATIONS

Patent Abstracts of Japan, Publication No. 2005-012889, published Jan. 13, 2005.
Japanese Office Action issued Oct. 9, 2012 in corresponding Japanese Patent Application No. 2010-541897.
"Battery Charging Specification Revision 1.0", Mar. 8, 2007, USB Implementers Forum, Inc. (p. 1-25).
International Search Report for PCT/JP2008/003704, Mailed Jan. 20, 2009.

* cited by examiner

*Primary Examiner* — Paul Yanchus, III
(74) *Attorney, Agent, or Firm* — Staas & Halsey LLP

(57) ABSTRACT

A power usage method is provided for using power supplied from a first device at a second device. The power usage method includes causing the second device to perform an initialization process to obtain a value of a current used when consuming the power at a voltage that is a minimum prerequisite for the second device to perform a predetermined process; and causing the second device to execute the predetermined process while consuming the power in a manner that the current does not exceed the obtained value.

14 Claims, 6 Drawing Sheets

TLA

| VOLTAGE(V) | 5.0 | 4.9 | 4.8 | 4.7 | 4.6 | 4.5 | 4.4 | 4.3 | 4.2 | 4.1 |
|---|---|---|---|---|---|---|---|---|---|---|
| CURRENT(mA) | 100 | 330 | 500 | 630 | 750 | 850 | 950 | 1030 | 1120 | 1180 |

| VOLTAGE(V) | 4.0 | 3.9 | 3.8 | 3.7 | 3.6 | 3.5 | 3.4 | 3.3 | 3.2 | 3.1 |
|---|---|---|---|---|---|---|---|---|---|---|
| CURRENT(mA) | 1240 | 1290 | 1340 | 1380 | 1430 | 1480 | 1520 | 1550 | 1580 | 1610 |

| VOLTAGE(V) | 3.0 | 2.9 | 2.8 | 2.7 | 2.6 | 2.5 | 2.4 | 2.3 | 2.2 | 2.1 | 2.0 |
|---|---|---|---|---|---|---|---|---|---|---|---|
| CURRENT(mA) | 1630 | 1650 | 1670 | 1690 | 1710 | 1730 | 1745 | 1760 | 1775 | 1790 | 1800 |

TLB

| VOLTAGE(V) | 5.0 | 4.9 | 4.8 | 4.7 | 4.6 | 4.5 | 4.4 | 4.3 | 4.2 | 4.1 | |
|---|---|---|---|---|---|---|---|---|---|---|---|
| CURRENT(mA) | 100 | 330 | 500 | 600 | 690 | 780 | 860 | 930 | 990 | 1050 | |
| VOLTAGE(V) | 4.0 | 3.9 | 3.8 | 3.7 | 3.6 | 3.5 | 3.4 | 3.3 | 3.2 | 3.1 | |
| CURRENT(mA) | 1090 | 1130 | 1170 | 1200 | 1230 | 1260 | 1290 | 1310 | 1330 | 1350 | |
| VOLTAGE(V) | 3.0 | 2.9 | 2.8 | 2.7 | 2.6 | 2.5 | 2.4 | 2.3 | 2.2 | 2.1 | 2.0 |
| CURRENT(mA) | 1365 | 1380 | 1395 | 1410 | 1425 | 1440 | 1455 | 1470 | 1480 | 1490 | 1500 |

TLC

| VOLTAGE(V) | 5.0 | 4.9 | 4.8 | 4.7 | 4.6 | 4.5 | 4.4 | 4.3 | 4.2 | 4.1 | |
|---|---|---|---|---|---|---|---|---|---|---|---|
| CURRENT(mA) | 100 | 330 | 470 | 540 | 600 | 640 | 670 | 690 | 720 | 740 | |
| VOLTAGE(V) | 4.0 | 3.9 | 3.8 | 3.7 | 3.6 | 3.5 | 3.4 | 3.3 | 3.2 | 3.1 | |
| CURRENT(mA) | 760 | 770 | 780 | 790 | 800 | 810 | 820 | 830 | 840 | 850 | |
| VOLTAGE(V) | 3.0 | 2.9 | 2.8 | 2.7 | 2.6 | 2.5 | 2.4 | 2.3 | 2.2 | 2.1 | 2.0 |
| CURRENT(mA) | 860 | 870 | 875 | 880 | 885 | 888 | 891 | 894 | 896 | 898 | 900 |

POWER USAGE METHOD AND DEVICE THAT RECEIVES POWER FROM HOST

CROSS-REFERENCE TO RELATED APPLICATIONS

This is a continuation application under 35 U.S.C. §111(a) of International Application PCT/JP2008/003704, filed Dec. 11, 2008, which is hereby incorporated by reference in its entirety into this application.

FIELD

The present invention is related to a method of supplying power from a master device to a slave device via an interface such as USB and using the power at the slave device, etc.

BACKGROUND

FIGS. 11 and 12 illustrate the ranges of power supplied to a slave device in an old specification and a new specification, respectively.

In recent years, USB (Universal Serial Bus) has become prevalent as an interface for connecting two devices. For example, various devices may be connected to a personal computer by USB, such as a printer, a digital camera, a mobile phone unit, a floppy disk drive, a portable audio-player, a PDA (Personal Digital Assistant), and a USB memory.

According to the USB, data is exchanged between two devices, and also power is supplied from a host device (a higher-level device; typically a personal computer or a USB hub) to a slave device (a lower-level device). Therefore, with the use of the USB, a secondary battery provided in the slave device may be charged by supplying power from the host device.

Non-patent document 1 defines specifications for supplying power to a slave device by the USB.

In a specification (old specification) previous to this specification (new specification), power needs to be supplied by the VBus from the host device to the slave device within the range of the "existing region" indicated in FIG. 11.

However, with the new specification, it is possible to supply power within the range of the "extended region" indicated in FIG. 11. Alternatively, when data communications are also performed between the host device and the slave device, it is also possible to supply power within the ranges of the "high speed extended region" and the "full speed/low speed extended region" indicated in FIG. 12, according to the transfer mode. As described above, in the new specification, restrictions relevant to supplying power are mitigated.

Non-patent document 1: "Battery Charging Specification Revision 1.0", May 8, 2007, USB Implementers Forum, Inc.

However, because the restrictions have been mitigated as described above, there are cases where the slave device does not receive power supplied as expected. When the slave device does not receive power, the slave device may not normally execute some processes.

For example, assuming that the slave device does not recognize being connected to the master device unless the slave device receives a voltage of four volts or more, the slave device does not operate properly when a voltage of only two volts is applied to the slave device.

SUMMARY

According to an aspect of the present invention, a power usage method is provided for using power supplied from a first device at a second device, the power usage method including causing the second device to perform an initialization process to obtain a value of a current used when consuming the power at a voltage that is a minimum prerequisite for the second device to perform a predetermined process; and causing the second device to execute the predetermined process while consuming the power in a manner that the current does not exceed the obtained value.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

DESCRIPTION OF EMBODIMENTS

Preferred embodiments of the present invention will be explained with reference to accompanying drawings.

Figure 1:
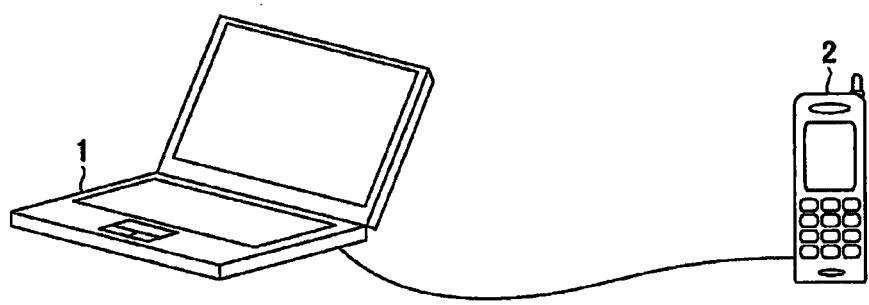
FIG. 1 illustrates an example of a personal computer and a USB device being connected to each other.
Figure 2:
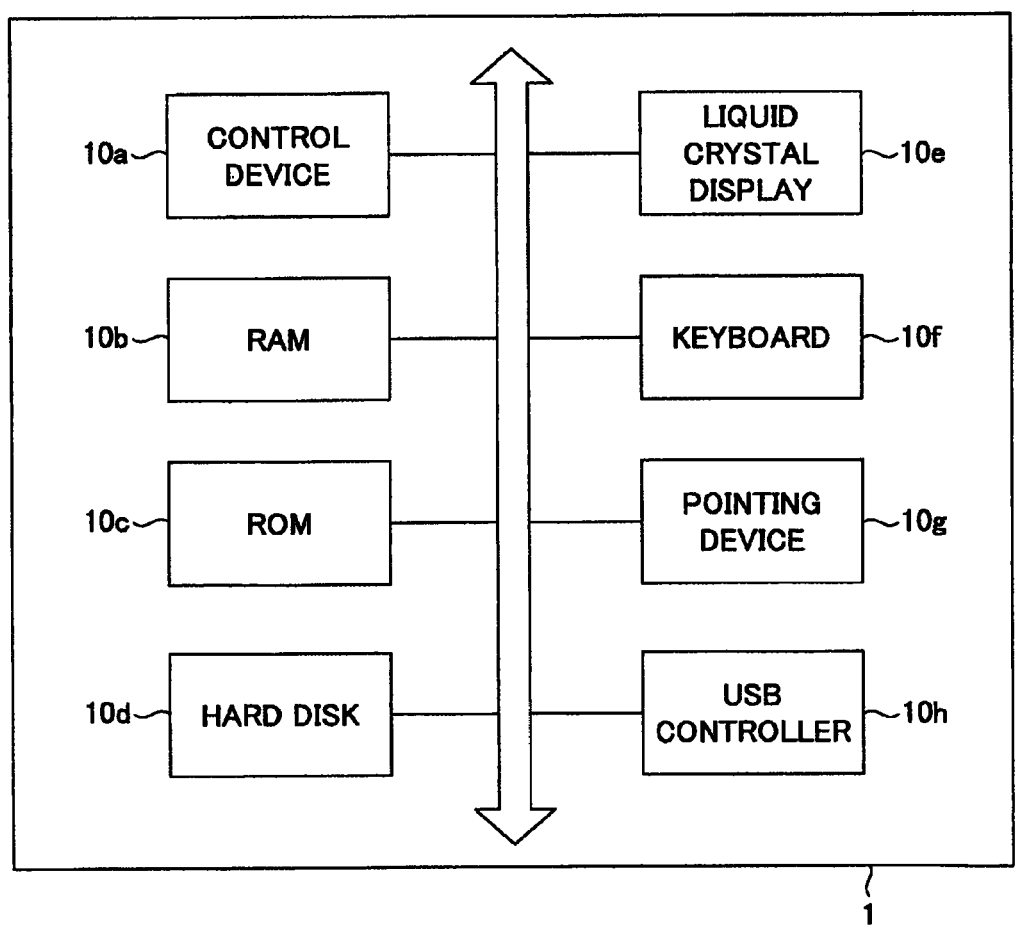
FIG. 2 illustrates an example of a hardware configuration of the personal computer.
Figure 3:
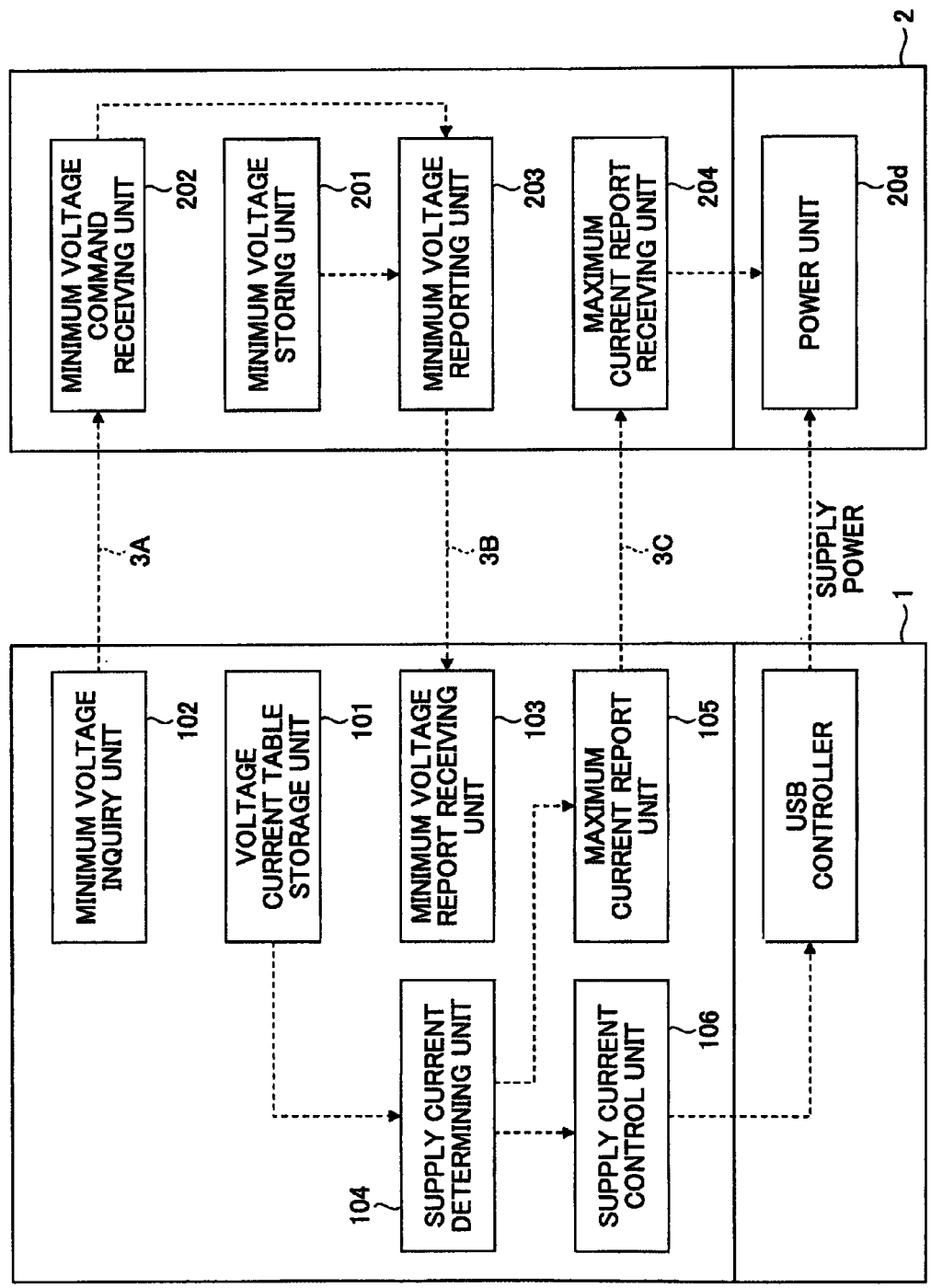
FIG. 3 illustrates examples of functional configurations of the personal computer and the USB device.
Figures 4, 5:
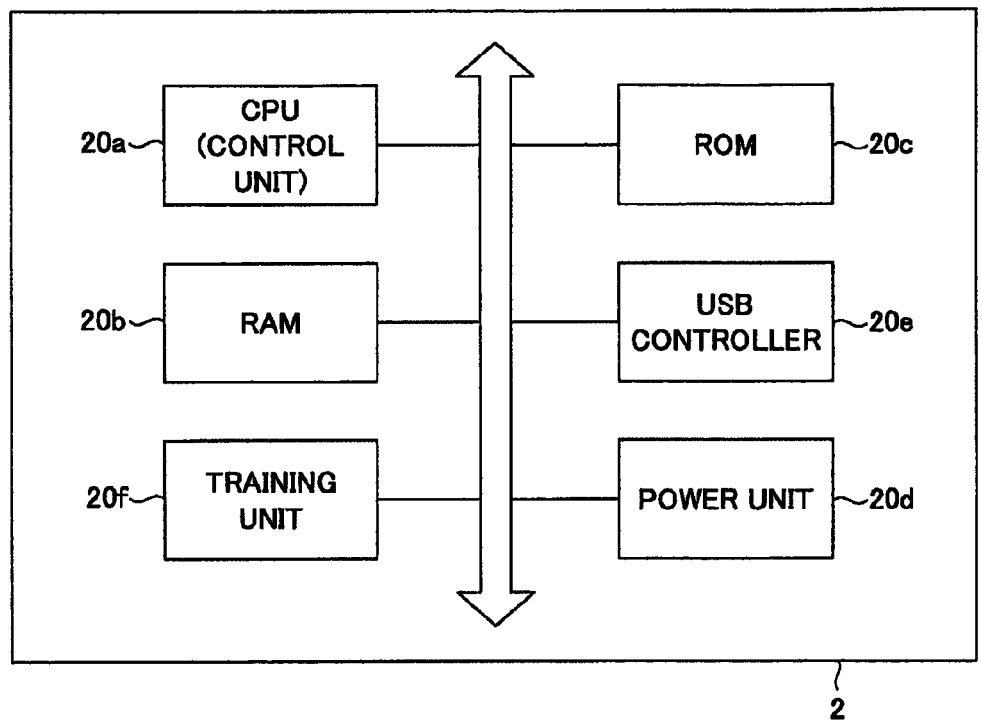
FIG. 4 illustrates an example of a hardware configuration of the USB device.
FIG. 5 illustrates an example of a voltage/current table TLA.

FIG. 1 illustrates an example of a personal computer 1 and a USB device 2 being connected to each other. FIG. 2 illustrates an example of the hardware configuration of the personal computer 1. FIG. 3 illustrates examples of the functional configurations of the personal computer 1 and the USB device 2. FIG. 4 illustrates an example of the hardware configuration of the USB device 2.

The personal computer 1 illustrated in FIG. 1 has an USB (Universal Serial Bus) interface.

The USB device 2 is, for example, a portable device provided with a USB interface, such as a mobile phone unit, a portable audio-player, and a PDA (Personal Digital Assistant).

The personal computer 1 and the USB device 2 are connected by a USB cable, and perform communications with each other. Furthermore, the personal computer 1 supplies power to the USB device 2. In the following example, the versions of USB are USB 2.0 and 1.0.

As illustrated in FIG. 2, the personal computer 1 includes a control device 10a, a RAM (Random Access Memory) 10b, a ROM (Read Only Memory) 10c, a hard disk 10d, a liquid crystal display 10e, a keyboard 10f, a pointing device 10g, and a USB controller 10h.

The control device 10a is, for example, a CPU (Central Processing Unit) or an MPU (Micro Processing Unit), and the control device 10a executes programs stored in the RAM 10b or the ROM 10c. When the control device 10a is an MPU, the RAM 10b and the ROM 10c may be integrally combined with the control device 10a.

The keyboard 10f and the pointing device 10g are devices used by the user for inputting commands and data into the personal computer 1.

The liquid crystal display 10e displays various images such as a desktop, windows, and dialogue boxes.

The USB controller 10h is an IC (Integrated Circuit) for controlling the USB.

As illustrated in FIG. 3, the ROM 10c stores programs for implementing functions of a voltage current table storage unit 101, a minimum voltage inquiry unit 102, a minimum voltage report receiving unit 103, a supply current determining unit 104, a maximum current report unit 105, and a supply current control unit 106. These programs are executed by the control device 10a. These programs may be provided as the BIOS (Basic Input/Output System) or as a driver of the OS (Operating System). In the latter case, the driver is stored in the hard disk 10d.

As illustrated in FIG. 4, the USB device 2 includes a CPU 20a, a RAM 20b, a ROM 20c, a power unit 20d, a USB controller 20e, and a training unit 20f. Furthermore, the USB device 2 includes various hardware components depending on the type of the USB device 2. For example, if the USB device 2 is a mobile phone unit, the USB device 2 includes a wireless circuit, an antenna, a liquid crystal display, operation buttons, a voice processing circuit, a digital camera, a microphone, a speaker, and a flash memory.

The USB controller 20e is an IC for controlling the USB. The power unit 20d includes a secondary battery and a charge control circuit. The secondary battery is charged by power supplied from the personal computer 1 via a USB cable. Furthermore, the secondary battery supplies power to the respective units of the USB device 2. The charge control circuit controls the operation of charging the secondary battery, and prevents overcharging.

The ROM 20c stores programs for implementing functions of a minimum voltage storing unit 201, a minimum voltage command receiving unit 202, a minimum voltage reporting unit 203, and a maximum current report receiving unit 204 illustrated in FIG. 3. These programs are executed by the CPU 20a. Details of the training unit 20f are given below.

Figure 6:
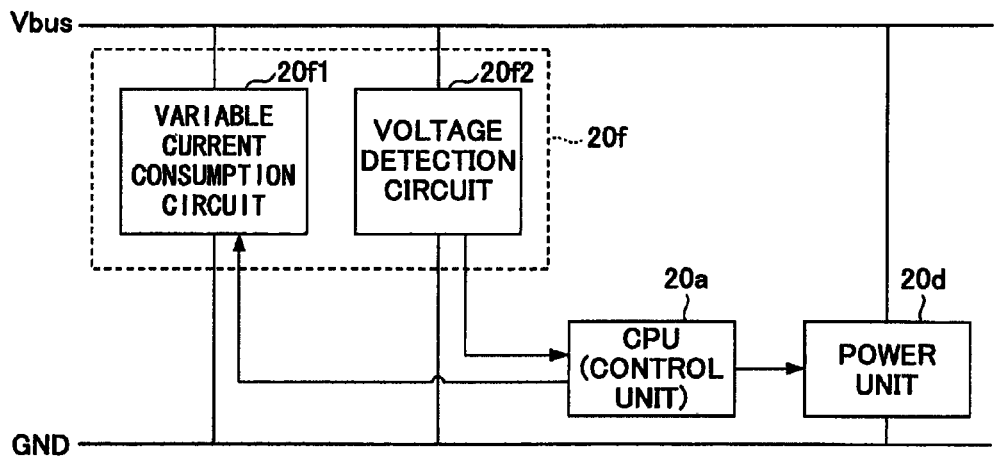
FIG. 6 illustrates an example of a configuration of a training unit.

FIG. 5 illustrates an example of a voltage/current table TLA, and FIG. 6 illustrates an example of a configuration of the training unit 20f.

Details are given of processes performed by the respective units in the personal computer 1 and the USB device 2 illustrated in FIG. 3, and processes performed by the power unit 20d and the training unit 20f illustrated in FIG. 4.

In the personal computer 1, the voltage current table storage unit 101 stores the voltage/current table TLA. As illustrated in FIG. 5, the voltage/current table TLA indicates the relationship between the voltage applied to the USB device 2 and the current supplied to the USB device 2. Contents of the voltage/current table TLA are determined according to characteristics of the USB controller 10h, and are stored in the voltage current table storage unit 101.

The voltage/current table TLA indicates the relationship between the voltage and the current when data communications are not performed after the personal computer 1 is connected to the USB device 2. A case where data communications are performed is described below.

When the USB device 2 is connected to the personal computer 1, the minimum voltage inquiry unit 102 sends a command (hereinafter, "command 3A") to the USB device 2, requesting the USB device 2 to send a response indicating a minimum requisite voltage (hereinafter, "minimum voltage Eb").

The minimum voltage storing unit 201 of the USB device 2 stores the minimum requisite voltage, i.e., the minimum voltage Eb, required for the USB device 2 to charge itself.

The minimum voltage command receiving unit 202 receives the command 3A from the personal computer 1.

When the command 3A is received, the minimum voltage reporting unit 203 sends, to the personal computer 1, response data 3B indicating the minimum voltage Eb stored in the minimum voltage storing unit 201.

In the personal computer 1, the minimum voltage report receiving unit 103 receives the response data 3B from the USB device 2.

The supply current determining unit 104 searches the voltage/current table TLA (see FIG. 5) for the current value corresponding to the minimum voltage Eb indicated in the response data 3B that has been received. The supply current determining unit 104 determines the value of the search found current as the current to be supplied to the USB device 2 (hereinafter, "maximum current Ib"). For example, when the minimum voltage Eb is 4.0 V, the maximum current Ib is determined as 1240 mA.

The maximum current report unit 105 sends, to the USB device 2, report data 3C indicating the determined maximum current Ib.

The supply current control unit 106 controls the USB controller 10h so that the power corresponding to the determined maximum current Ib is supplied.

In the USB device 2, the maximum current report receiving unit 204 receives the report data 3C from the personal computer 1.

According to the above processes, a current that is less than or equal to the maximum current Ib is supplied to the USB device 2, so that the secondary battery is charged.

The charge control circuit of the power unit 20d charges the secondary battery with a voltage that is greater than or equal to the minimum voltage Eb. The current that flows to the secondary battery is controlled so as not to exceed the maximum current Ib reported from the personal computer 1.

The charge control circuit of the power unit 20d may control the current flowing to the secondary battery so as not to exceed the current detected by the training unit 20f of FIG. 4.

The training unit 20f measures the current required for obtaining the minimum voltage Eb at the USB device 2 (hereinafter, "maximum current Ih"), and performs a process for sending a report to the power unit 20d.

As illustrated in FIG. 6, the training unit 20f includes a variable current consumption circuit 20f1 and a voltage detection circuit 20f2. As described below, the training unit 20f is used for performing a test to detect the relationship between the voltage and the current when performing a predetermined process (in the present embodiment, a charging process).

When the USB device 2 is connected to the personal computer 1 and a current is supplied from the personal computer 1 to the USB device 2, part of the current is supplied to the variable current consumption circuit 20f1 by gradually increasing the amount of the current, to be consumed by the variable current consumption circuit 20f1. The variable current consumption circuit 20f1 is a circuit used for testing (training). The resistance of the variable current consumption circuit 20f1 is the same as the resistance when the secondary battery of the power unit 20d is being charged.

The amount of current supplied to the variable current consumption circuit 20f1 is controlled by the CPU 20a.

The voltage detection circuit 20f2 continues measuring the voltage while a current is being supplied to the variable current consumption circuit 20f1. When the voltage detection circuit 20f2 detects that the measured voltage has reached the minimum voltage Eb, the voltage detection circuit 20f2 reports this to the CPU 20a.

When the report is received from the voltage detection circuit 20f2, the CPU 20a sets, as the maximum current Ih, the current supplied to the variable current consumption circuit 20f1 at the corresponding time point (i.e., the time point at which the voltage applied to the variable current consumption circuit 20f1 reaches the minimum voltage Eb). Then, the CPU 20a reports the determined maximum current Ib to the power unit 20d.

The charge control circuit of the power unit 20d controls the current supplied to the secondary battery so as not to exceed the maximum current Ih obtained by the training unit 20f and the CPU 20a. Accordingly, the secondary battery is charged by a voltage that is greater than or equal to the minimum voltage Eb.

Figure 7:
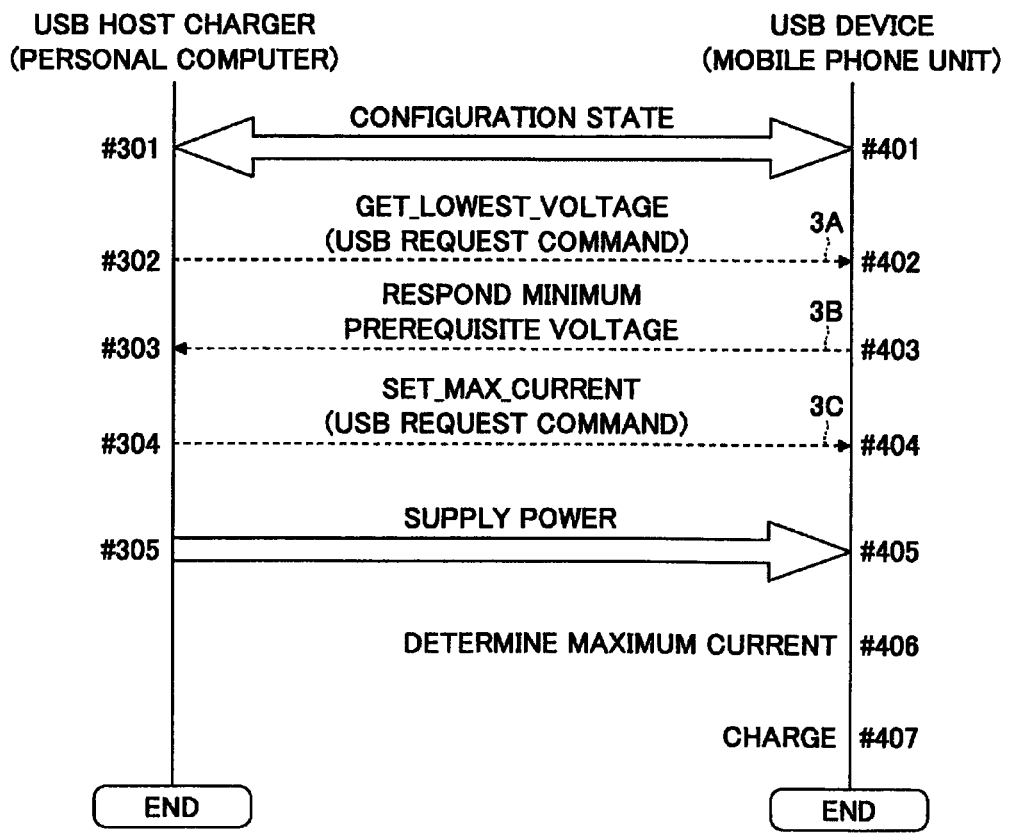
FIG. 7 is a sequence diagram for describing the overall flow of a process performed when the personal computer and the USB device are connected.

FIG. 7 is a sequence diagram for describing the overall flow of a process performed when the personal computer 1 and the USB device 2 are connected.

A description is given of the overall flow of a process performed by the personal computer 1 and the USB device 2 with reference to FIG. 7.

Referring to FIG. 7, when the USB device 2 is connected to the personal computer 1, the personal computer 1 and the USB device 2 recognize that they are connected to each other as in the conventional technology, and makes various settings (configuration) relevant to hardware and software (#301, #401).

Then, the personal computer 1 sends a command 3A to the USB device 2 to inquire the minimum voltage (#302). When the USB device 2 receives the command 3A (#402), the USB device 2 sends the response data 3B indicating the minimum voltage Eb to the personal computer 1 (#403).

When the response data 3B is received (#303), the personal computer 1 searches for the maximum current Ib corresponding to the minimum voltage Eb from the voltage/current table TLA (see FIG. 5), and sends the report data 3C to the USB device 2 to report the maximum current Ib (#304).

Then, the personal computer 1 supplies power to the USB device 2 (#305).

The USB device 2 receives the power (#405), calculates the maximum current Ih (#306), and charges the secondary battery with the maximum current Ih being the higher limit of current (#407).

According to the present embodiment, in a specification where restrictions relevant to supplying power are expanded, the USB device 2 is operated more reliably compared to the conventional technology.

Figures 8, 9, 10:
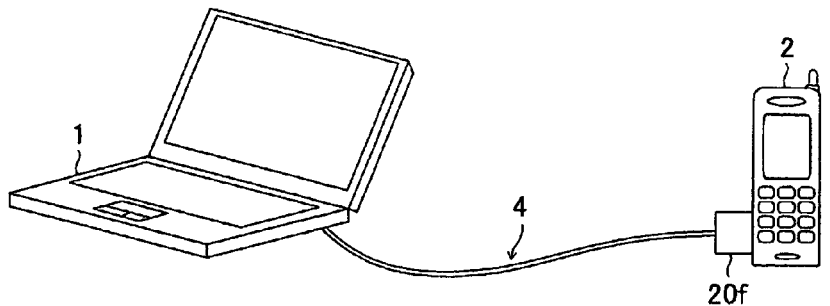
FIG. 8 illustrates an example of a voltage/current table TLB.
FIG. 9 illustrates an example of a voltage/current table TLC.
FIG. 10 illustrates another example of the personal computer and the USB device being connected to each other.
Figure 11:
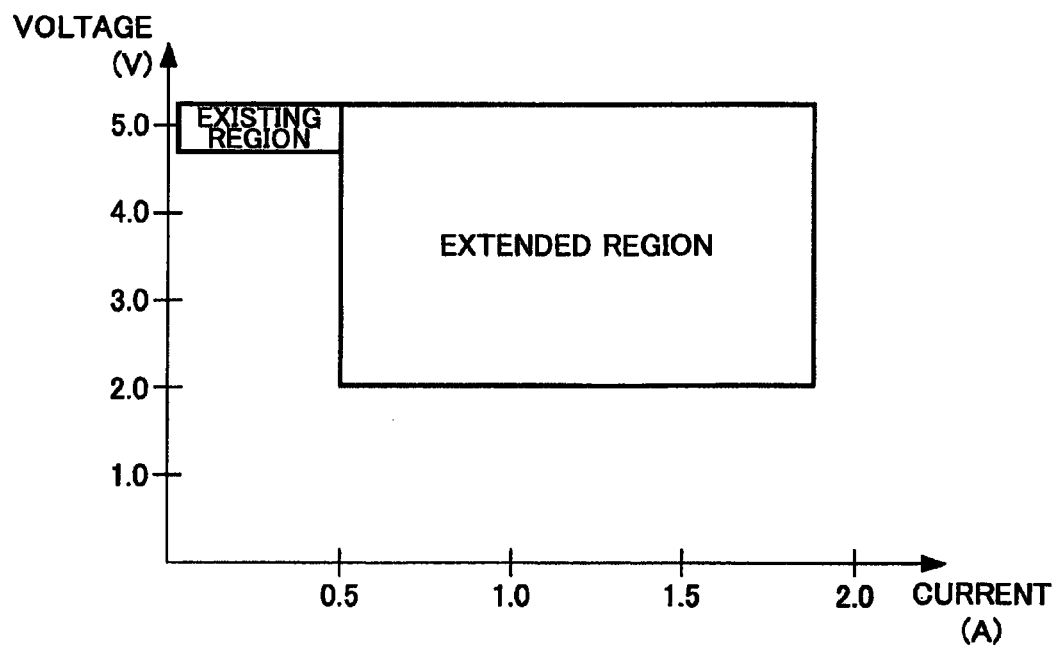
FIG. 11 indicates ranges used for supplying power to a slave device in an old specification and a new specification.
Figure 12:
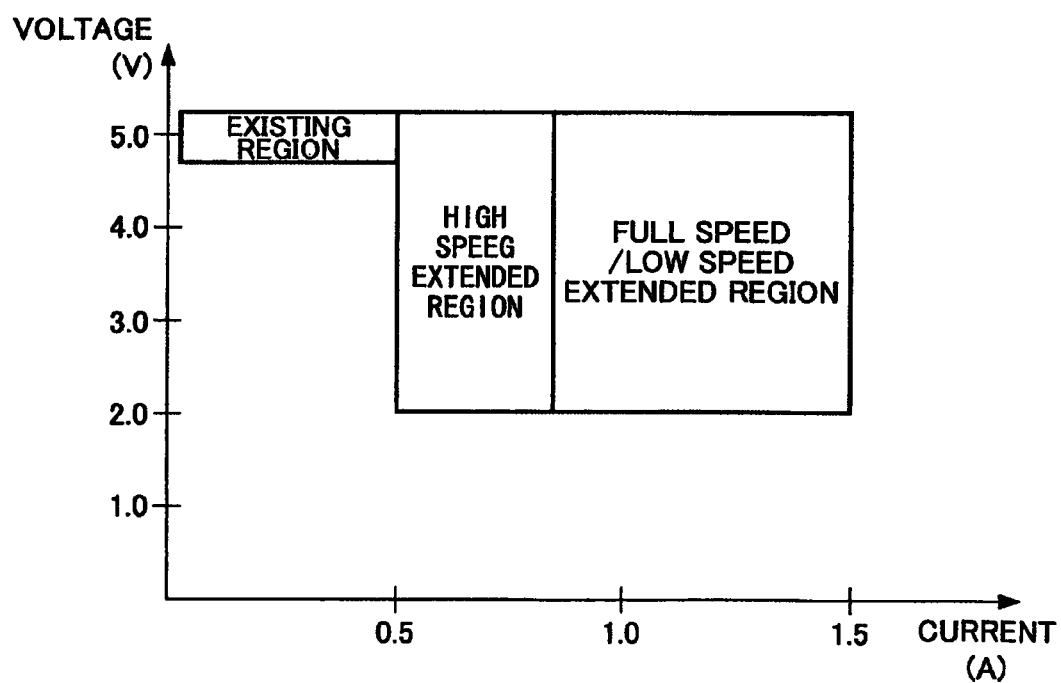
FIG. 12 indicates ranges used for supplying power to a slave device in an old specification and a new specification.

FIG. 8 illustrates an example of a voltage/current table TLB, FIG. 9 illustrates an example of a voltage/current table TLC, and FIG. 10 illustrates another example of the personal computer 1 and the USB device 2 being connected to each other.

When the personal computer 1 and the USB device 2 are to perform data communications after being connected to each other, the relationship between the voltage and the current is different from that indicated in the voltage/current table TLA according to the communication speed.

Accordingly, a voltage/current table TLB for a full speed mode and a low speed mode and a voltage/current table TLC for a high speed mode are provided in the voltage current table storage unit 101 in advance.

When the transfer mode is determined to be the full speed mode or the low speed mode according to the configuration, the personal computer 1 uses the voltage/current table TLB instead of the voltage/current table TLA to determine the maximum current Ib. When the transfer mode is determined to be the high speed mode, the personal computer 1 uses the voltage/current table TLC instead of the voltage/current table TLA to determine the maximum current Ib.

In the present embodiment, the training unit 20f is provided in the USB device 2 as illustrated in FIG. 6. However, as illustrated in FIG. 10, the training unit 20f may be provided in a connector of the USB device 2 provided on a USB cable 4 connecting the personal computer 1 and the USB device 2. However, in this case, the connector provided on the USB cable 4 on the USB device 2 side is provided with a controller for controlling the current supplied to the variable current consumption circuit 20f1 and a controller for controlling the current supplied to the USB device 2 so that the maximum current Ih is supplied to the USB device 2.

Functions of the voltage current table storage unit 101 and the supply current control unit 106 illustrated in FIG. 3 may also be provided in the USB hub. In this case, the current to be output is controlled for each USB device 2 that is connected.

Furthermore, the overall configuration or configurations of the respective units of the personal computer 1 and the USB device 2, the process contents, the process order, and configurations of the tables may be appropriately modified according to the purpose of the present invention.

According to one embodiment of the present invention, in a specification where restrictions relevant to power supply are expanded, the device that receives power is capable of operating more reliably compared to the conventional technology.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power usage method for using power supplied from a first device at a second device, the power usage method comprising:

causing the second device to report to the first device a first value corresponding to a voltage that is a minimum prerequisite for the second device to perform a predetermined process;

causing the first device to report to the second device a second value corresponding to a current used when the power is supplied from the first device to the second device at the voltage of the first value;

causing the first device to supply the power to the second device based on a predetermined standard; and causing the second device to execute the predetermined process while consuming the power supplied from the first device in a manner such that the current does not exceed the second value.

2. A power usage method for using power supplied from a first device at a second device, the power usage method comprising:

causing the second device to perform a test to detect a relationship between a voltage and a current when the second device performs a predetermined process in order to obtain a value of the current used when consuming the power at the voltage that is a minimum prerequisite for the second device to perform the predetermined process; and causing the second device to execute the predetermined process while consuming the power supplied from the first device in a manner such that the current does not exceed the value detected by the test.

3. The power usage method according to claim 2, wherein the test is performed by a training circuit for the predetermined process.

4. The power usage method according to claim 1, wherein the predetermined process charges a battery of the second device.

5. The power usage method according to claim 1, wherein the first device is one of a personal computer and a USB (Universal Serial Bus) hub, and
the second device is a USB device.

6. A slave device that receives power from a host and performs a predetermined process, the device comprising:

a reporting unit that reports to the host a first value corresponding to a voltage that is a minimum prerequisite for the device to perform a predetermined process;

a receiving unit that receives from the host a report indicating a second value corresponding to a current used when the device receives the power supplied from the host at the voltage of the first value; and an executing unit that executes the predetermined process while consuming the power supplied from the host in a manner such that the current does not exceed the second value.

7. A device, that receives power from a host and performs a predetermined process, the device comprising:

a detecting unit that performs a test to detect a relationship between a voltage and a current when the device performs a predetermined process in order to obtain a value of the current used in the device when consuming the power at the voltage that is the minimum prerequisite for the device to perform the predetermined process; and an executing unit that executes the predetermined process while consuming the power supplied from the host in a manner such that the current does not exceed the value detected by the detecting unit.

8. The slave device according to claim 6, further comprising:
a battery,
wherein the executing unit executes the predetermined process to charge the battery.

9. A non-transitory computer-readable recording medium having stored therein a program for causing a computer of a device that receives power from a host to execute a process comprising:

reporting to the host a first value corresponding to a voltage that is a minimum prerequisite for the device to perform a predetermined process;

receiving from the host a report indicating a second value corresponding to a current used when the power is supplied from the host to the device at the voltage of the first value;

receiving supply of the power from the host based on a predetermined standard; and executing the predetermined process while consuming the power supplied from the host in a manner such that the current does not exceed the second value.

10. A non-transitory computer-readable recording medium having stored therein a program for causing a computer of a device that receives power from a host to execute a process comprising:

performing a test to detect a relationship between a voltage and a current when the device performs a predetermined process in order to obtain a value of the current used when consuming the power at the voltage that is a minimum prerequisite for performing the predetermined process; and executing the predetermined process while consuming the power supplied from the host in a manner such that the current does not exceed the value detected by the test.

11. The power usage method according to claim 2, wherein the predetermined process charges a battery of the second device.

12. The device according to claim 7, further comprising:
a battery,
wherein the executing unit executes the predetermined process to charge the battery.

13. The non-transitory computer-readable recording medium as claimed in claim 9, wherein the predetermined process charges a battery of the device.

14. The non-transitory computer-readable recording medium as claimed in claim 10, wherein the predetermined process charges a battery of the device.

* * * * *

UNITED STATES PATENT AND TRADEMARK OFFICE
CERTIFICATE OF CORRECTION

PATENT NO. : 8,533,499 B2  
APPLICATION NO. : 13/067553  
DATED : September 10, 2013  
INVENTOR(S) : Keiichi Murakami et al.

Page 1 of 1

It is certified that error appears in the above-identified patent and that said Letters Patent is hereby corrected as shown below:

In the Claims:

In Col. 7, Line 29, In Claim 6, after "A" delete "slave".
In Col. 8, Line 3, In Claim 8, after "The" delete "slave".

Signed and Sealed this
Twenty-fourth Day of December, 2013

Margaret A. Focarino
*Commissioner for Patents of the United States Patent and Trademark Office*